(12) United States Patent
Stefan

(10) Patent No.: US 10,538,405 B1
(45) Date of Patent: Jan. 21, 2020

(54) FOOD WRAPPING STATION

(71) Applicant: Antony Stefan, Sarasota, FL (US)

(72) Inventor: Antony Stefan, Sarasota, FL (US)

(73) Assignee: AS/A INNOVATIONS LLC, Sarasota, FL (US)

( * ) Notice: Subject to any disclaimer, the term of this patent is extended or adjusted under 35 U.S.C. 154(b) by 0 days.

(21) Appl. No.: 16/058,455

(22) Filed: Aug. 8, 2018

(51) Int. Cl.
| | | |
|---|---|---|
| *A47F 5/08* | (2006.01) | |
| *B26F 3/02* | (2006.01) | |
| *B65H 35/06* | (2006.01) | |
| *B65H 16/00* | (2006.01) | |
| *A47B 77/04* | (2006.01) | |
| *B65H 16/02* | (2006.01) | |

(52) U.S. Cl.
CPC .............. *B65H 35/06* (2013.01); *A47B 77/04* (2013.01); *B65H 16/005* (2013.01); *B65H 16/021* (2013.01); *A47B 2200/0084* (2013.01)

(58) Field of Classification Search
CPC .. B21D 1/345; B65H 35/002; B65H 35/0086; B65H 35/0006; B65H 2301/5154; B65H 2701/1944; B26D 7/025; A47K 10/38; A47K 2010/3233; A47K 2010/3253; A47K 10/3836; Y10T 83/896; Y10T 225/287; Y10T 225/30; Y10T 83/323; Y10T 225/295; Y10T 225/243; Y10T 83/902; Y10T 225/232; Y10T 225/237
USPC ......... 83/614, 175, 649, 455, 610, 456, 454, 83/375, 378, 382, 387, 388, 389, 650, 83/611, 622; 225/43, 93, 1, 20, 22, 25, 225/34, 39, 42, 46, 47, 66, 89, 91, 31, 225/7.37, 38; 242/594.5, 55.3, 55.53
See application file for complete search history.

(56) References Cited

U.S. PATENT DOCUMENTS

| | | | | |
|---|---|---|---|---|
| 392,502 | A | * | 6/1888 | Earl |
| 2,819,141 | A | | 1/1958 | Becht |
| 2,823,969 | A | * | 2/1958 | Traver ............... B65H 35/0086 83/454 |
| 2,858,086 | A | * | 10/1958 | Saphier ................ B65H 35/002 225/38 |
| 3,142,217 | A | * | 7/1964 | Busse .................... B26D 1/105 83/375 |
| 3,190,520 | A | * | 6/1965 | Wyant ................ A47K 10/3827 225/39 |
| 3,702,672 | A | * | 11/1972 | Becht .................... B65B 43/123 225/106 |
| 3,915,364 | A | | 10/1975 | Dieguez |
| 4,408,811 | A | * | 10/1983 | Richardson ............ A47K 10/24 312/138.1 |
| 4,458,570 | A | * | 7/1984 | Morrison ............. B65H 35/002 83/375 |

(Continued)

*Primary Examiner* — Ghassem Alie

(74) *Attorney, Agent, or Firm* — Edward M. Livingston, Esq.; Bryan L. Loeffler, Esq.; Livingston Loeffler, P.A.

(57) ABSTRACT

A food wrapping station (1) having a housing (2) that may be inserted into an existing drawer (27) or that can be easily adapted to be an independent drawer within a cabinet (28). The housing has a concealed front storage space (18) covered by an access panel (8). The access panel doubles as a work surface. A food wrap dispenser is located in a rear storage area (19) that allows a user to dispense food wrap out over the access panel to wrap food placed thereon. A cutter (24) is located on a divider (6) in front of the rear storage area so a user can cut the food wrap after being extended over the access panel.

14 Claims, 4 Drawing Sheets

(56) References Cited

U.S. PATENT DOCUMENTS

| | | | | |
|---|---|---|---|---|
| 4,645,107 | A | * | 2/1987 | Norris .................. B65H 35/002 225/34 |
| D300,703 | S | * | 4/1989 | Miels ............................ D6/523 |
| 5,322,201 | A | | 6/1994 | Garr |
| 5,758,559 | A | * | 6/1998 | Capitao, Jr. ............ B65H 35/04 83/614 |
| 5,984,158 | A | | 11/1999 | Frank |
| 6,725,753 | B2 | | 4/2004 | Bell |
| 6,915,935 | B2 | | 7/2005 | Portnoy |
| 7,249,700 | B1 | * | 7/2007 | Watson .................. B65B 41/16 225/34 |
| 7,481,345 | B2 | | 1/2009 | Rice |
| 2003/0071100 | A1 | * | 4/2003 | Miller .................... A47K 10/38 225/38 |
| 2004/0129123 | A1 | | 7/2004 | Miller |
| 2005/0127083 | A1 | | 6/2005 | Russell |
| 2006/0065095 | A1 | * | 3/2006 | Ambrose ............... A47K 10/38 83/650 |
| 2007/0051770 | A1 | | 3/2007 | Berg |
| 2012/0132686 | A1 | | 5/2012 | Elash et al. |

* cited by examiner

View A-A

FIG. 6 View B-B

1

FOOD WRAPPING STATION

FIELD OF THE INVENTION

This invention relates to wrapping for storing food and, more particularly a food wrapping station that provides storage for food wrapping, such as plastic wrap and aluminum foil, and a work surface for wrapping food.

BACKGROUND OF THE INVENTION

Plastic wrap, cling film, shrink wrap, Saran wrap, cling wrap, food wrap, or pliofilm is a thin plastic film or food wrap typically used for sealing food items in containers and/or to wrap food. Likewise, aluminum foil is a type of food wrap used for sealing food items in containers. Food is wrapped in order to preserve it.

Food wrap is typically sold on rolls in box containers with a cutting edge. Dispensing food wrap from said box containers can be a clumsy process as food wrap can be difficult to handle. For instance, plastic wrap sticks to itself which means if it is inadvertently folded, it becomes difficult to straighten. This is particularly true when the plastic wrap is being cut. The cutting process causes the plastic wrap to rebound from the cut causing folds that bring sections of plastic wrap in contact with one another. These sections then stick together making the fold permanent unless corrected by the user. Often if the plastic wrap becomes too folded it is regrettably thrown away and a new piece must be used, thereby resulting in waste. Similar problems hold true for aluminum foil.

An additional problem arises when accessing, removing and replacing conventional box containers stored in drawers. This is especially true when handling food wherein an individual may have unclean hands from handling uncooked food and/or no free hands available to go digging for a box of food wrap and then to open the box to access the food wrap. In addition, conventional box containers have long serrated cutting blades that pose a risk to users especially when awkwardly trying to wrap a piece of food or container.

Therefore, a need exists for a food wrapping station that provides storage for food wrapping, such as plastic wrap and aluminum foil, a work surface for wrapping food and a dispenser and cutter that makes the food wrapping process easier and safer to accomplish.

SUMMARY OF THE INVENTION

The primary object of the present invention is to provide a food wrapping station that provides storage for food wrapping, such as plastic wrap and aluminum foil, a work surface for wrapping food and a dispenser and cutter that makes the food wrapping process easier and safer to accomplish.

The present invention fulfills the above and other objects by providing a food wrapping station with a housing that may be inserted into an existing drawer or can be easily adapted to be an independent drawer within a cabinet. The housing has a concealed front storage space covered by an access panel. The access panel doubles as a work surface. A food wrap dispenser is located in a rear storage area that allows a user to dispense food wrap out over the access panel to wrap food placed thereon. A cutter is located on a divider in front of the rear storage area so a user can cut the food wrap after being extended over the access panel.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 6 is a sectional side view along lines B-B of FIG. 5 of a food wrapping station of the present invention that is a drawer.

DESCRIPTION OF THE PREFERRED EMBODIMENTS

Figure 1:
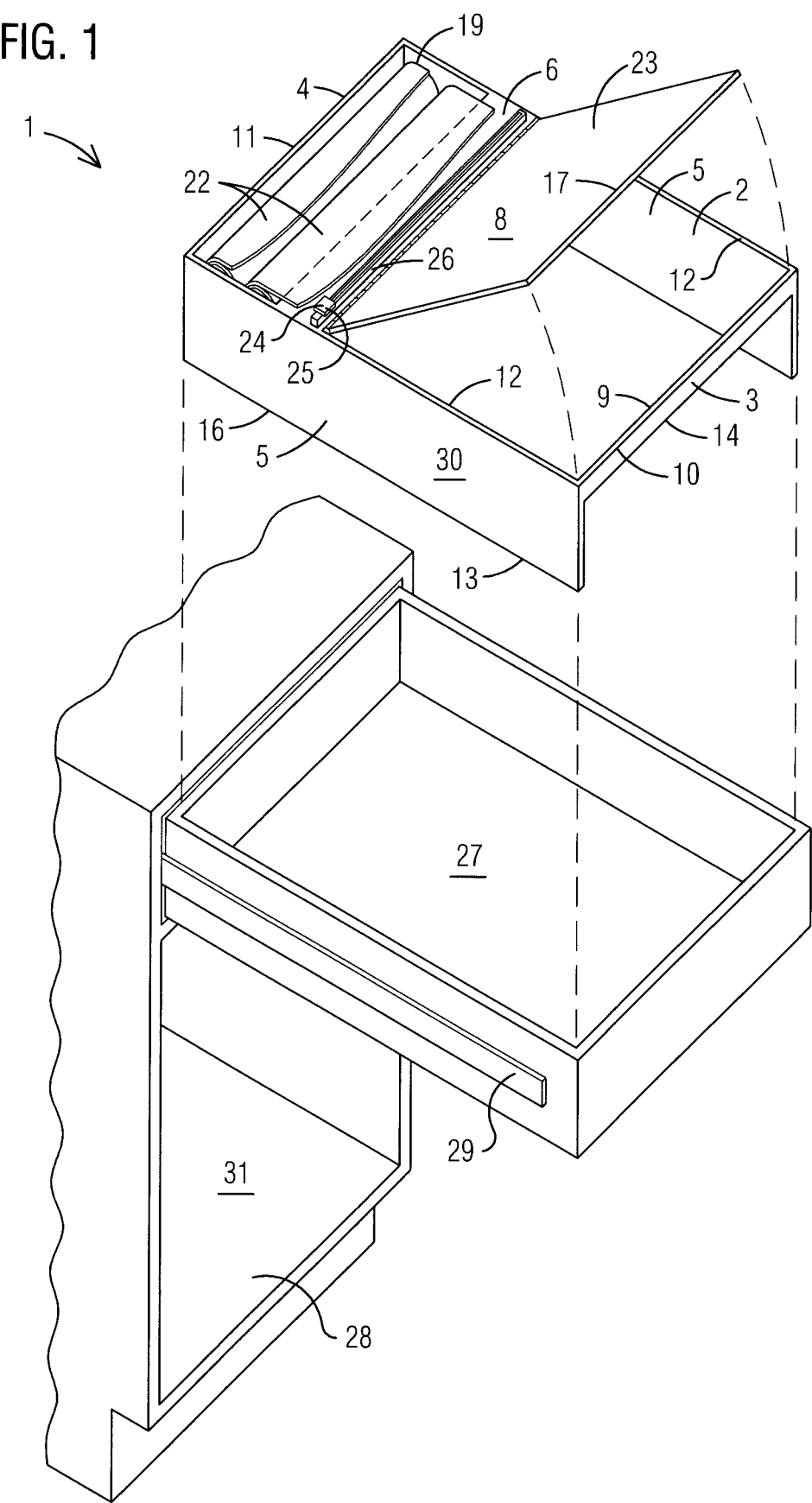
FIG. 1 is an exploded perspective top view of a food wrapping station of the present invention that is insertable into an existing drawer.

For purposes of describing the preferred embodiment, the terminology used in reference to the numbered accessories in the drawings is as follows:

1. food wrapping station, generally
2. housing
3. front wall
4. rear wall
5. side wall
6. divider
7. bottom panel
8. access panel
9. upper perimeter edge of housing
10. upper edge of front wall
11. upper edge of rear wall
12. upper edge of side wall
13. bottom perimeter edge of housing
14. bottom edge of front wall
15. bottom edge of rear wall
16. bottom edge of side wall
17. perimeter edge of access panel
18. front storage space
19. rear storage space
20. roll support means
20a. support bracket
20b. insert
21. inner surface of side wall
22. roll
23. top surface of access panel
24. cutter
25. blade
26. track
27. drawer
28. cabinet
29. drawer slide
30. outer surface of side panel
31. interior surface of cabinet With reference to FIG. 1-6 collectively, the food wrapping station 1 of the present invention comprises a preferably rectangular-shaped housing 2 having a front wall 3, a rear wall 4, side walls 5, a divider 6, a bottom panel 7 and a top access panel 8. The housing 2 has an upper perimeter edge 9 formed by an upper edge 10 of the front wall 3, an upper edge 11 of the rear wall 4 and upper edges 12 of the side walls 5. In addition, the housing 2 has a bottom perimeter edge 13 formed by a bottom edge 14 of the front wall 3, a bottom edge 15 of the rear wall 4 and bottom edges 16 of the side walls 5. Said divider 6 extends between the two side walls 5 and is located between the front wall 3 and the rear wall 4. Said divider 6.

The access panel 8 comprises a perimeter edge 17 that is supported by the divider 6, the upper edge 10 of the front wall 3 and front portions of the upper edges 12 of the side walls 5 that extend between the front wall 3 and the divider 6. The access panel 8 may be removable from the housing 2 or hingedly attached to the housing 2. As illustrated herein, the access panel 8 is hingedly attached to the divider 6. A front storage space 18 is created in the area within the housing 2 located between the front wall 3 and the divider 6 and covered by the access panel 8.

A rear storage space 19 is created by the rear wall 4, divider 6 and rear portions of the side walls 5. At least one roll support means 20 is located within the rear storage space 19 to support one or more rolls 22 of wrapping material therein. The at least one roll support means 20 may comprise at least one support bracket 20a and/or at least one insert 20b that is supported by the at least one support bracket 20a. The at least one insert 20b may be a dowel-shaped rod or equivalent structure that is inserted into a roll 22 and then supported in an elevated position by the at least one support bracket 20a. At least one roll 22 of food wrap may be stored in the rear storage space 19 on the at least one roll support means 20 in a position that is parallel to the rear wall 4 and the divider 6 so that food wrap may be unrolled off of the at least one roll 22 in a forward direction across a top surface 23 of the access panel 8. The food wrap may be pulled over an object, such as a bowl resting on the access panel 8, in order to cover the object. Alternatively, the food wrap may be pulled over the access panel 8 and then have an object place thereon to be wrapped.

A cutter 24 is preferably located on the divider 6. The cutter 24 may comprise at least one blade 25 that is stationary or attached to a track 26 located on the divider 6. To use the blade 25 attached to the track 26, food wrap is unrolled from the rear storage space 19 and pulled over the divider 6 and the access panel 8. Then the blade 25 is slid across the track 26 and through the food wrap, thereby cutting the food wrap.

Figure 2:
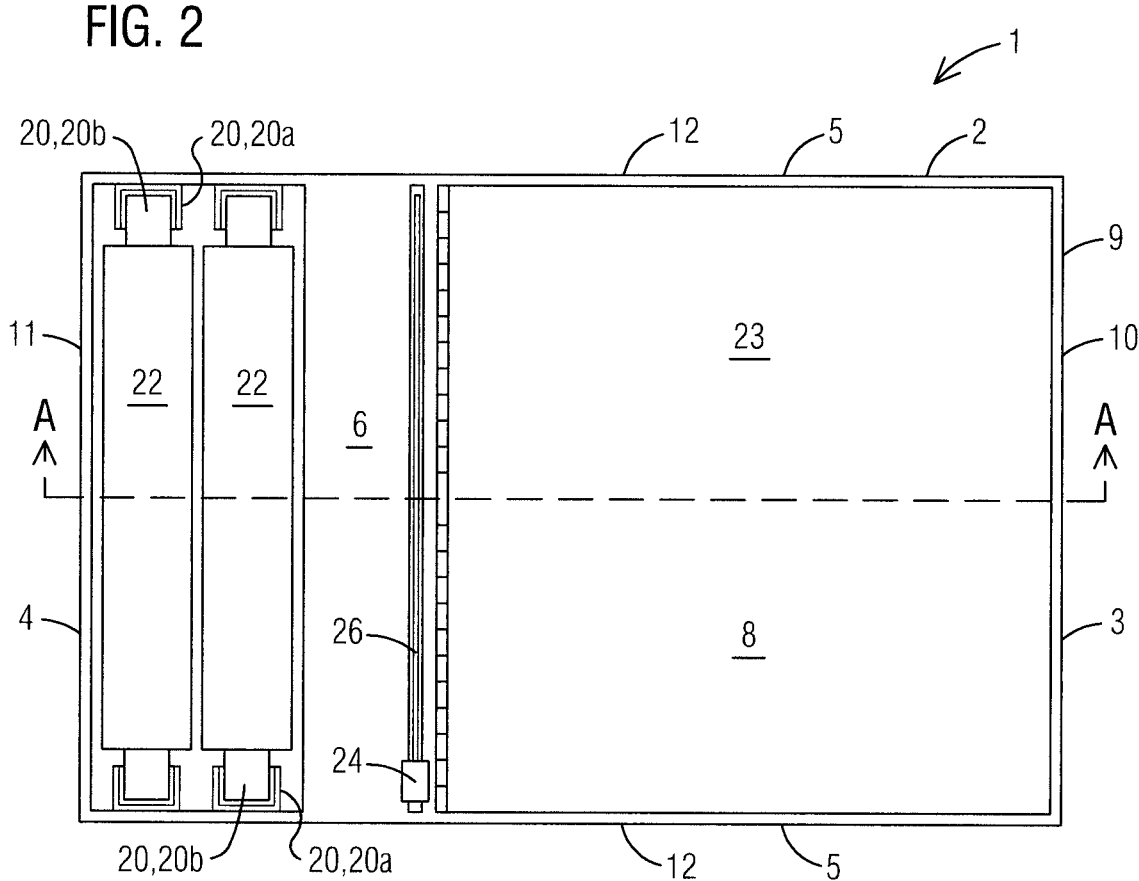
FIG. 2 is a top view of a food wrapping station of the present invention that is insertable into an existing drawer.
Figure 3:
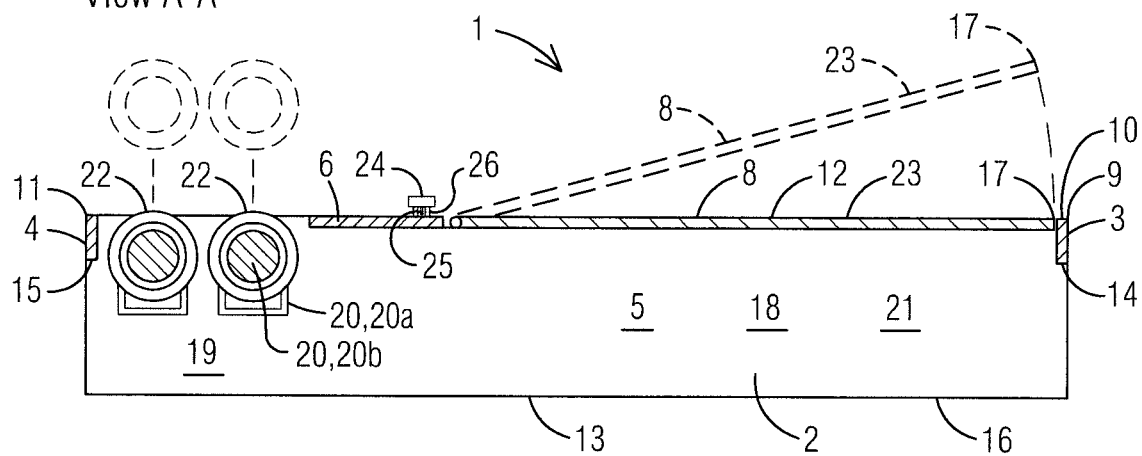
FIG. 3 is a sectional side view along lines A-A of FIG. 2 of a food wrapping station of the present invention that is insertable into an existing drawer.

With reference to FIGS. 1-3, a food wrapping station 1 of the present invention that is insertable into an existing drawer 27 is illustrated. The food wrapping station 1 comprises a housing 2 having a front wall 3, a rear wall 4, side walls 5, a divider 6 and a top access panel 8. The food wrapping station 1 may be set into an existing drawer 27 in a cabinet 28. The food wrapping station 1 may not require a bottom panel 7 as the drawer 27 into which the food wrapping station 1 is inserted provides a bottom support surface.

Figure 4:
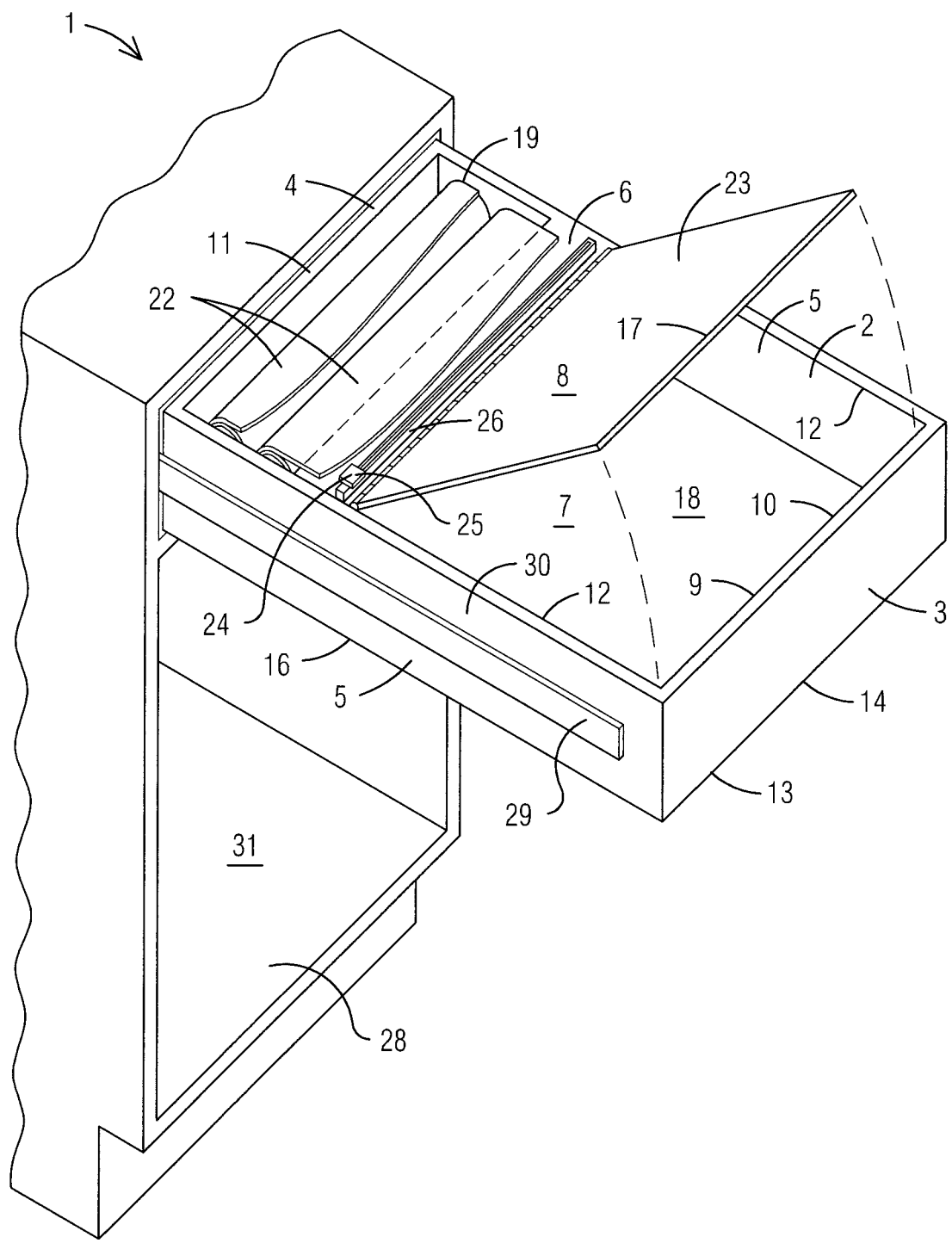
FIG. 4 is a perspective top view of a food wrapping station of the present invention that is a drawer.
Figure 5:
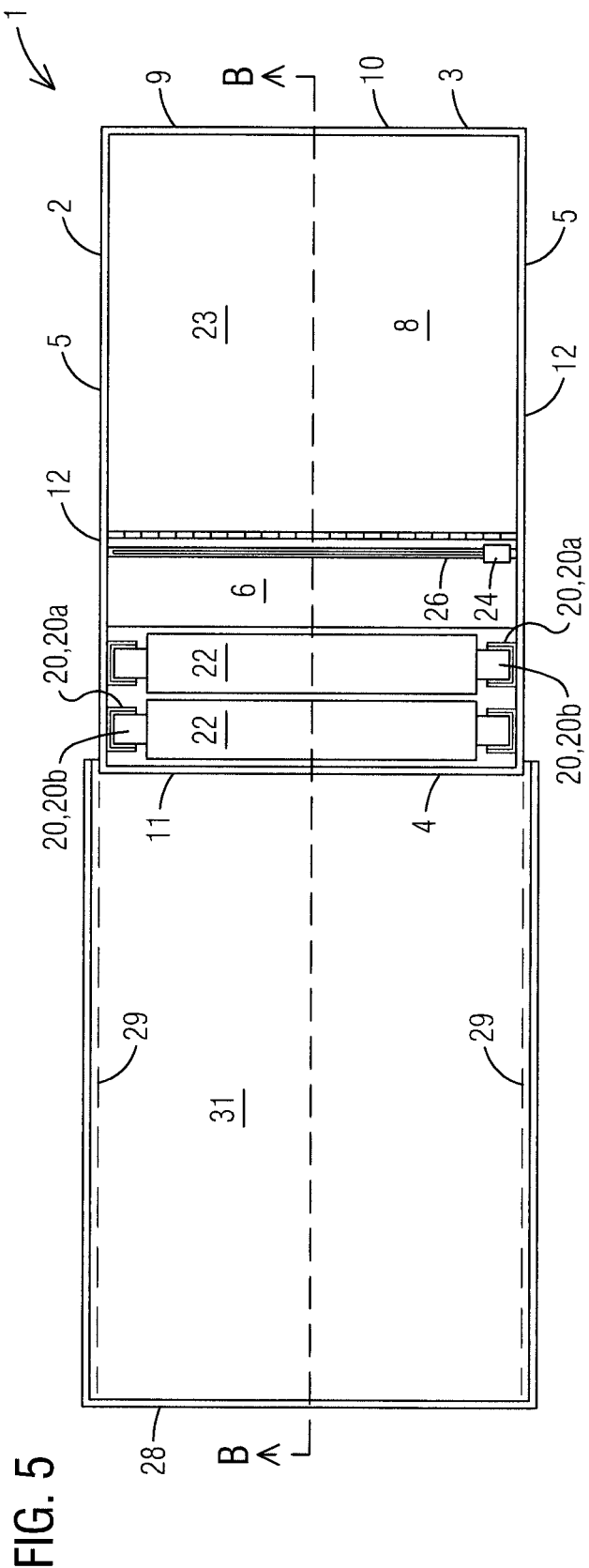
FIG. 5 is a top view of a food wrapping station of the present invention that is a drawer.
Figure 5:
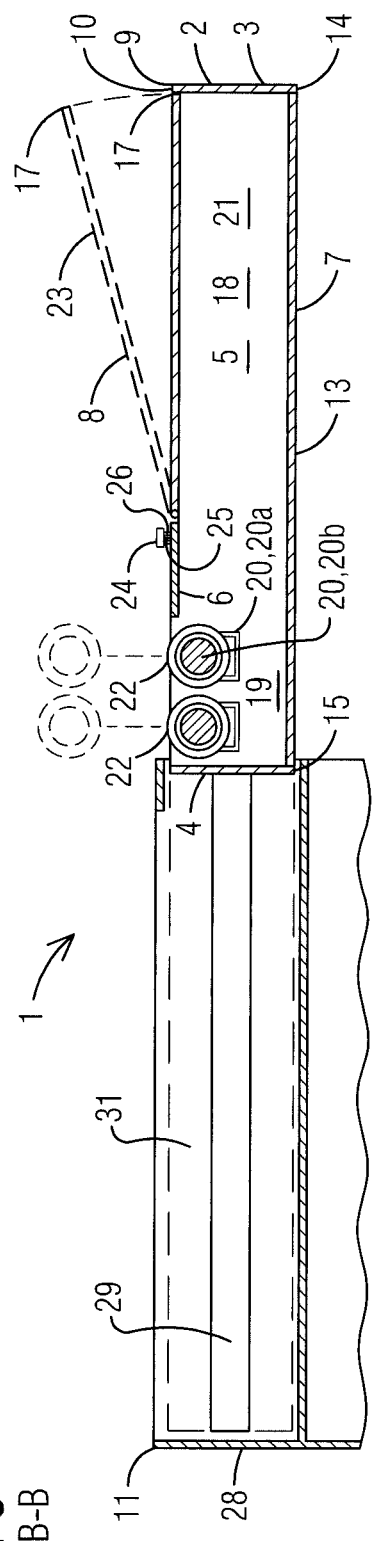

With reference to FIGS. 4-6, a food wrapping station of the present invention that is an independent drawer. The food wrapping station 1 comprises a housing 2 having a front wall 3, a rear wall 4, side walls 5, a divider 6, a bottom panel 7 and a top access panel 8. Drawer slides may 29 be located on outer surfaces 30 of the side walls 5 to allow the food wrapping station 1 to be inserted into a corresponding drawer slides 29 mounted within a cabinet 28 on interior surfaces 31 of the cabinet 28. The present invention may be integrated into a new drawer and/or sold as a kit of components that is permanently installed on a pre-existing drawer.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A food wrapping station comprising:
   a housing having a front wall, a rear wall, side walls and a divider;
   said housing having an upper perimeter edge formed by an upper edge of the front wall, an upper edge of the rear wall and upper edges of the side walls;
   said divider extending between the side walls, thereby separating the front storage space and the rear storage space;
   said front storage space located within the housing between the front wall and the divider;
   an access panel covering said front storage space, said access panel is mounted to said divider; said rear storage space
   located within the housing between the rear wall and the divider;
   at least one roll support means is located within the rear storage space to support one or more rolls of wrapping material;
   said divider having an upper surface that is adjacent to said access panel, said upper surface of the divider is substantially flush with an upper surface of said access panel when the said access panel is in a closed position; and a cutter located on said upper surface of said divider between said front storage space and rear storage space to allow wrapping material pulled from the rear storage space toward the front storage space, thereby positioning the wrapping material over said cutter.

2. The food wrapping station of claim 1 further comprising:
   a bottom panel.

3. The food wrapping station of claim 1 wherein:
   said cutter further comprises at least one stationary blade.

4. The food wrapping station of claim 1 wherein:
   said cutter further comprises at least one blade attached to a track located on the divider.

5. The food wrapping station of claim 1 wherein:
   said access panel is hingedly attached to divider.

6. The food wrapping station of claim 1 further comprising:
   drawer slides located on outer surfaces of the side walls.

7. The food wrapping station of claim 1 further comprising:
   drawer slides located on outer surfaces of the side walls; and
   a cabinet having drawer slides mounted on an interior surface which engage the drawer slides located on the outer surfaces of the side walls.

8. A food wrapping station comprising:
   a housing having a front wall, a rear wall, side walls and a divider;
   said housing having an upper perimeter edge formed by an upper edge of the front wall, an upper edge of the rear wall and upper edges of the side walls;

said divider extending between the side walls, thereby separating the front storage space and the rear storage space;

said front storage space located within the housing between the front wall and the divider;

an access panel covering said front storage when said the access panel is in a horizontal position, said access panel is mounted to said divider; said rear storage space located within the housing between the rear wall and the divider;

at least one roll support means is located within the rear storage space to support one or more rolls of wrapping material;

said divider having an upper surface that is coplanar with an upper surface of said access panel when said access panel is in said horizontal position; and a cutter located on said upper surface of said divider between said front storage space and rear storage space to allow wrapping material pulled from the rear storage space toward the front storage space, thereby positioning the wrapping material over said cutter.

9. The food wrapping station of claim 8 further comprising:
a bottom panel.

10. The food wrapping station of claim 8 wherein:
said cutter further comprises at least one stationary blade.

11. The food wrapping station of claim 8 wherein:
said cutter further comprises at least one blade attached to a track located across the divider.

12. The food wrapping station of claim 8 wherein:
said access panel is hingedly attached to the divider.

13. The food wrapping station of claim 8 further comprising:
drawer slides located on outer surfaces of the side walls.

14. The food wrapping station of claim 8 further comprising:
drawer slides located on outer surfaces of the side walls; and
a cabinet having drawer slides mounted on an interior surface which engage the drawer slides located on the outer surfaces of the side walls.

* * * * *